(12) United States Patent
Lui et al.

(10) Patent No.: US 10,175,700 B2
(45) Date of Patent: Jan. 8, 2019

(54) METHODS AND APPARATUS TO MINIMIZE COMMAND DYNAMICS OF A SATELLITE

(71) Applicant: The Boeing Company, Chicago, IL (US)

(72) Inventors: Timothy S. Lui, San Pedro, CA (US); Gary E. Lemke, Torrance, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/466,228

(22) Filed: Mar. 22, 2017

(65) Prior Publication Data

US 2018/0275683 A1 Sep. 27, 2018

(51) Int. Cl.
| | |
|---|---|
| G05D 1/00 | (2006.01) |
| B64G 1/24 | (2006.01) |
| G05D 1/08 | (2006.01) |
| B64G 1/36 | (2006.01) |
| B64G 1/40 | (2006.01) |

(52) U.S. Cl.
CPC ............. *G05D 1/0883* (2013.01); *B64G 1/24* (2013.01); *B64G 1/361* (2013.01); *B64G 1/405* (2013.01); *B64G 2001/245* (2013.01)

(58) Field of Classification Search
CPC ........ G05D 1/0883; B64G 1/24; B64G 1/361; B64G 1/405; B64G 2001/245
USPC ..... 701/13, 4, 513; 342/355; 244/164, 158.1
See application file for complete search history.

(56) References Cited

U.S. PATENT DOCUMENTS

| | | | |
|---|---|---|---|
| 5,459,669 | A | 10/1995 | Adsit et al. |
| 6,017,001 | A | 1/2000 | Lambeaux et al. |
| 6,076,774 | A | 6/2000 | Shah et al. |
| 6,253,125 | B1 | 6/2001 | Barker |
| 7,464,899 | B2 | 12/2008 | Elgersma et al. |
| 8,880,246 | B1* | 11/2014 | Karpenko ................ B64G 1/24 244/158.1 |
| 2008/0035797 | A1* | 2/2008 | Defendini .............. B64G 1/286 244/165 |
| 2017/0320599 | A1* | 11/2017 | Jeon ..................... G05D 1/0883 |

FOREIGN PATENT DOCUMENTS

EP 1526072 4/2005

OTHER PUBLICATIONS

European Patent Office, "Extended European Search Report," issued in connection with application No. 18154398.4 dated Aug. 16, 2018, 8 pages.

Eurasian Patent Office, "International Search Report" issued in connection with application No. 201890077, dated Aug. 31, 2018, 3 pages.

* cited by examiner

*Primary Examiner* — Marthe Y Marc-Coleman
(74) *Attorney, Agent, or Firm* — Hanley, Flight & Zimmerman, LLC

(57) ABSTRACT

Methods, apparatus, and articles of manufacture to minimize command dynamics of a satellite are disclosed. An example apparatus includes a steering law module to calculate a first set of vectors to maneuver a space vehicle, and calculate a second set of vectors based on projecting the first set of vectors onto a fixed plane. The apparatus further includes an attitude controller to generate an attitude command based on the first and the second sets of vectors to prevent an unplanned rotation by the space vehicle.

23 Claims, 8 Drawing Sheets

METHODS AND APPARATUS TO MINIMIZE COMMAND DYNAMICS OF A SATELLITE

FIELD OF THE DISCLOSURE

This disclosure relates generally to orbital space vehicles and, more particularly, to methods and apparatus to minimize command dynamics of a satellite.

BACKGROUND

Space vehicles such as satellites or resident space objects (RSO) typically utilize actuators such as thrusters and/or momentum devices to maintain an orbit around a celestial body. Typically, a satellite or an RSO orbiting the Earth employs deployable solar panels to power onboard electronics. The onboard electronics provide critical functionalities such as determining a position of a target of interest, determining a position of the satellite, etc. The onboard electronics control an ability of the satellite to simultaneously point to the target of interest while keeping the solar panels pointed toward a power source such as the Sun.

Typical satellites maintain an orbit around a celestial body by controlling thrusters and/or momentum devices using commands generated using attitude steering laws. Typically, attitude steering laws involve calculating two vectors to describe a full rotation representation for an orbit. As a satellite pursues an orbit, the two vectors may change with respect to each other, bringing the two vectors closer together in some instances, and pushing the two vectors farther apart in other instances. As the two vectors change with respect to each other, the attitude steering laws may generate commands that produce undesirable satellite behavior due to practical limitations of the satellite and various considerations that influence calculations of the two vectors.

SUMMARY

An example apparatus includes a steering law module to calculate a first set of vectors to maneuver a space vehicle, and calculate a second set of vectors based on projecting the first set of vectors onto a fixed plane. The apparatus further includes an attitude controller to generate an attitude command based on the first and the second sets of vectors to prevent an unplanned rotation by the space vehicle.

An example method includes calculating a first set of vectors to maneuver a space vehicle, calculating a second set of vectors based on projecting the first set of vectors onto a fixed plane, and generating an attitude command based on the first and the second sets of vectors to prevent an unplanned rotation by the space vehicle.

An example tangible computer-readable storage medium comprising instructions that, when executed, cause a machine to at least calculate a first set of vectors to maneuver a space vehicle, calculate a second set of vectors based on projecting the first set of vectors onto a fixed plane, and generate an attitude command based on the first and the second sets of vectors to prevent an unplanned rotation by the space vehicle.

BRIEF DESCRIPTION OF THE DRAWINGS

Wherever possible, the same reference numbers will be used throughout the drawing(s) and accompanying written description to refer to the same or like parts. The figures are not to scale.

DETAILED DESCRIPTION

Figure 1:
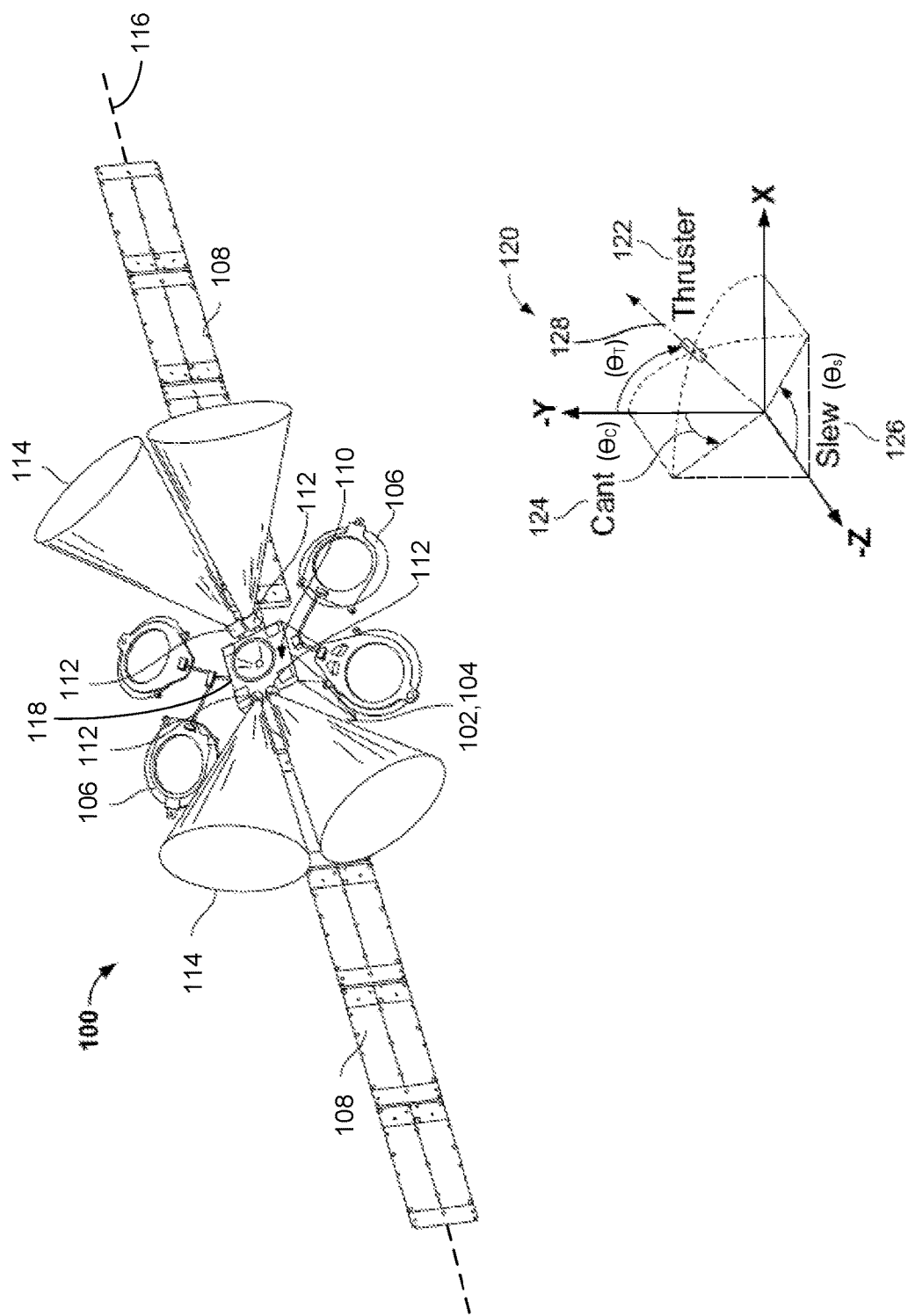
FIG. 1 is an example satellite in which the examples disclosed herein may be implemented.

Methods and apparatus to minimize command dynamics of a satellite are disclosed herein. Typically, spacecraft or space vehicles such as satellites or resident space objects (RSO) utilize actuators such as thrusters and/or momentum devices to maintain an orbit around a celestial body such as the Earth. For example, a satellite may maintain a geosynchronous orbit (GEO) around the Earth to transmit, relay, and/or repeat communications from another satellite to a target on the Earth (e.g., an antenna station in Los Angeles). The satellite may maintain the orbit by controlling the thrusters and/or the momentum devices of the satellite by using commands generated using attitude steering laws.

Typically, an attitude steering law involves calculating two vectors (e.g., a set of nominal vectors) to describe a full rotation representation for a satellite to complete an orbit. The two vectors may be a primary vector (e.g., a nominal primary vector) and a secondary vector (e.g., a nominal secondary vector). Attitude steering laws may be used to generate commands to control an attitude of a satellite. As used herein, the term "attitude" refers to an orientation and/or a position in space with respect to one or more celestial bodies (e.g., the Earth, the Sun, etc.). A primary vector may be a vector from a center of gravity of the satellite pointing towards a target (e.g., a point on the Earth). A secondary vector may be a vector from the center of gravity of the satellite pointing towards a power source (e.g., a light source from a celestial body, the Sun, etc.). As the satellite moves along the orbit, the two vectors may change with respect to each other, bringing the two vectors closer together in some instances, and pushing the two vectors farther apart in other instances. As the two vectors change with respect to each other, the attitude steering laws may be used to generate commands that produce undesirable satellite behavior due to practical limitations of the satellite and various considerations that enter calculations of the two vectors.

In some examples, an attitude steering law is used to calculate two vectors based on inertial reference frames. For example, an attitude steering law may be used to calculate a primary vector and a secondary vector based on targets on the Earth and the Sun, where the Earth and the Sun are fixed in time (i.e., time-independent) and space (i.e., location-independent). For example, if an accelerometer were placed on the Earth and/or the Sun, the accelerometer would detect zero acceleration. Due to the inertial reference frames (e.g., the Earth, the Sun, etc.) and a cyclical nature of a satellite traveling along an orbit, an angle between the two vectors may produce a singularity condition. As used herein, the term "singularity condition" may refer to a condition where two vectors (e.g., the primary vector and the secondary vector) are collinear to each other, and a vector cross-product of the two vectors produces a vector of magnitude zero. For example, twice during an orbit (e.g., twice during an orbit around the Earth), the satellite may be in line with the Earth and the Sun. Thus, once an orbit, the angle between the two vectors may be 0 degrees because the two vectors become collinear with respect to each other. Similarly, once an orbit, the angle between the two vectors may be 180 degrees because the two vectors become collinear with respect to each other. At these moments, the attitude steering law may be used to generate a vector of magnitude zero, thus producing a singularity condition.

During a singularity condition, an attitude steering law of a satellite may produce a command (e.g., an attitude command) to slew the satellite 180 degrees about a primary vector of the satellite at an instantaneous rate. Further, as the satellite experiences two singularity conditions for every orbit, the satellite slews 180 degrees twice per orbit, effectively forcing a rotation of 360 degrees per orbit about the primary vector of the satellite. For example, as the primary vector and the secondary vector of the satellite move away from orthogonality, a rate (e.g., a command rate, a thrust rate, etc.) required to follow the commands generated by the attitude steering law may approach infinity. As the commands approach infinity, the attitude steering law may quantitatively result in the calculation of a 180-degree rotation at an instantaneous rate. The instantaneous rate may exceed a maneuvering capability of the satellite and produce undesirable command dynamics.

Example satellite controller apparatus disclosed herein are operative to minimize command dynamics of a satellite. As used herein, the term "command dynamics" refers to one or more effects of a space vehicle performing a command generated using an attitude steering law. For example, an effect may be a payload of the satellite that is not able to update a vector (e.g., a primary vector, a secondary vector, etc.) fast enough to compensate for a 180-degree rotation at an instantaneous rate. In another example, an effect may be one or more bus attitude actuators of the satellite that are unable to drive attitude control error to zero at all times.

Example satellite controller apparatus disclosed herein minimize command dynamics of a satellite by calculating and using a set of alternate vectors during a time period when a singularity takes place. Alternatively, the example satellite controller apparatus may use a combination (e.g., a blending) of the set of alternate vectors and the set of nominal vectors (e.g., the nominal primary vector and the nominal secondary vector). The example satellite controller apparatus may determine when a singularity occurs based on projecting a primary vector and a secondary vector of the satellite from a three-dimensional (3-D) plane to a two-dimensional (2-D) plane. The example satellite controller apparatus may calculate a vector normal to the projected vectors (e.g., the projected primary and secondary vectors) and an angle between the projected vectors. The example satellite controller apparatus may determine that a singularity occurs as the angle between the projected vectors approaches 0 degrees or 180 degrees.

Example satellite controller apparatus disclosed herein calculate a set of alternate vectors to the set of nominal vectors. For example, in addition to the nominal primary vector, the nominal secondary vector, the nominal normal vector, etc., the satellite controller apparatus may calculate an alternate primary vector, an alternate secondary vector, an alternate normal vector, etc. Transitioning between the nominal set of vectors and the alternate set of vectors may result in smoothed maneuvers of the satellite by avoiding unplanned jerks, rotations, slews, etc. of the satellite. The example satellite controller apparatus may use the set of nominal vectors, the set of alternate vectors, and/or a combination thereof to minimize command dynamics of a satellite.

FIG. 1 is an example satellite 100 in which the examples disclosed herein may be implemented. The satellite 100 of the illustrated example includes a satellite body 102, which includes on-board processors (e.g., a satellite controller 104), batteries and/or fuel tanks, antennas (e.g., communication antennas, etc.) 106, solar panels 108, and a propulsion system 110. The example propulsion system 110 includes thrusters 112 that have thrust cones 114. In this example, the solar panels 108 are in a deployed state (e.g., unfolded away from the satellite body 102), thereby altering the inertial/mass characteristics of the satellite 100 in contrast to an un-deployed state of the satellite 100 where the solar panels 108 are folded inward towards the satellite body 102. The satellite 100 may move to align an axis 116 of the solar panels 108 with a nominal primary vector, a nominal secondary vector, a nominal normal vector, etc. The satellite 100 further includes a sensor 118 (e.g., an optical sensor, a star tracker, etc.) to obtain sensor data related to a location, orientation, position, etc. of the satellite 100.

In operation, the satellite 100 may communicate with external systems (e.g., transmit as well as receive) via the antennas 106 to maneuver the satellite 100 between orbital paths and/or orbital heights and/or to provide data to external ground-based systems, for example. In particular, the satellite 100 of the illustrated example is maneuvered by activating (e.g., firing) the thrusters 112, which are electric (e.g., ion-based, an ion propulsion system, xenon-based thrusters, etc.). For example, the satellite 100 may vary a duration and/or a pulse of different thrusters of the thrusters 112 to maneuver the satellite 100, and/or control an attitude of the example satellite 100 relative to a celestial body (e.g., a space body) that the satellite 100 orbits.

In the illustrated example of FIG. 1, a maneuvering frame of reference 120 of the example satellite 100 is shown. The maneuvering frame of reference 120 illustrates a thruster plume angle 122 that is depicted by the symbol, $\theta_T$, a cant angle 124 that is depicted by the symbol, $\theta_C$, and a slew angle 126 that is depicted by the symbol, $\theta_S$. The frame of reference 120 depicts numerous degrees of rotational movement in which the satellite 100 may be oriented/rotated during an orbit or a movement between different orbits. In this example, a resultant vector 128 of the satellite 100 is shown. In particular, the example resultant vector 128 depicts a resulting direction of motion of the satellite 100 based on the vector sum of the activation and/or orientation of individual thrusters of the thrusters 112. The satellite 100 may use the example resultant vector 128 to align the axis 116 with the nominal primary vector, the nominal secondary vector, etc. of the satellite 100.

Figure 2:
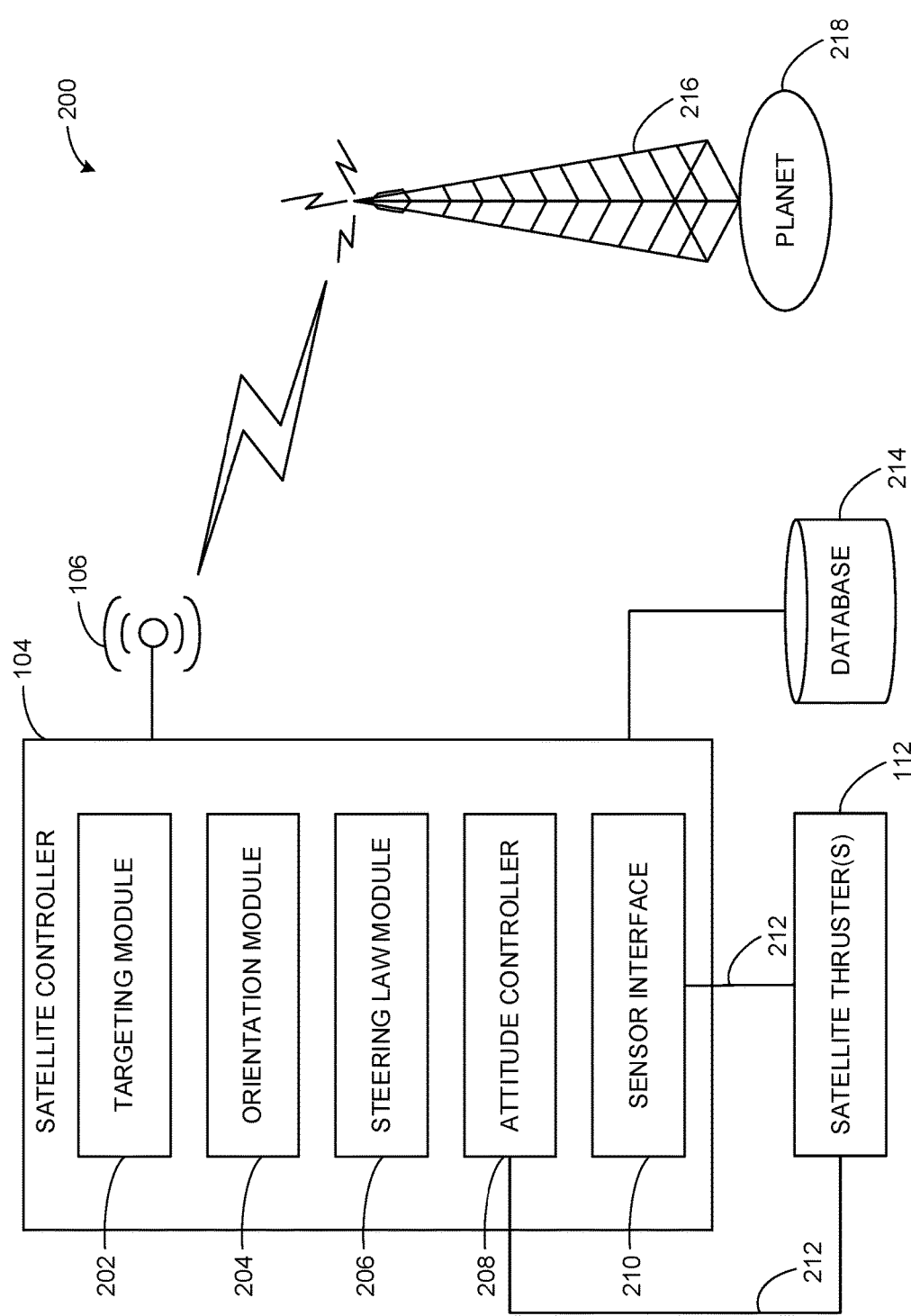
FIG. 2 is an example satellite guidance system that may be used to implement the examples disclosed herein.

FIG. 2 is an example satellite guidance system 200 that may be used to implement the examples disclosed herein. In the illustrated example, the satellite guidance system 200 includes the example satellite controller 104, which is implemented in a satellite (e.g., the satellite 100). The example satellite controller 104 includes a targeting module 202, an orientation module 204, a steering law module 206, an attitude controller 208, and a sensor interface 210. The example satellite guidance system 200 also includes communication lines 212 that communicatively couple the satellite controller 104, the attitude controller 208, and/or the sensor interface 210 to the satellite thruster(s) 112 shown in FIG. 1. In this example, the satellite controller 104 is also communicatively coupled to the antenna 106 which, in turn, is in communication with a ground-based communication system 216 of a planet 218 (e.g., the Earth) around which the satellite orbits. In the illustrated example, the satellite controller 104 is communicatively coupled to and/or includes a database 214.

In the illustrated example of FIG. 2, the satellite controller 104 includes the targeting module 202 to target a point of interest on a celestial body (e.g., the planet 218). The example targeting module 202 may use an Earth-centered inertial (ECI) coordinate frame to determine a set of coordinates for the point of interest. For example, the targeting module 202 may map a current date and time to a known location on the Earth (e.g., the equator) to determine a set of coordinates for the ground-based communication system 216. Alternatively, the example targeting module 202 may utilize the antennas 106 to obtain a position of the point of interest (e.g., communicate with the ground-based communication system 216 to obtain a set of coordinates). In some examples, the targeting module 202 calculates an instant (e.g., a current) primary vector of the satellite 100. For example, the targeting module 202 may calculate a current vector from a center of gravity of the satellite 100 to a point of interest on the planet 218. In some instances, the targeting module 202 calculates an instant (e.g., a current) and/or a nominal boresight vector. As used herein, the term "boresight vector" refers to a vector where maximum gain (e.g., maximum radiated power) of a directional antenna can be achieved. For example, the antennas 106 may achieve maximum gain when the antennas 106 align with a boresight vector. The example targeting module 202 may store data (e.g., targeting coordinates) in and/or retrieve data from the example database 214.

In the illustrated example of FIG. 2, the satellite controller 104 includes the orientation module 204 to determine a position of the satellite 100. The example orientation module 204 may utilize the sensor 118 of FIG. 1 to determine where the satellite 100 is located with respect to one or more navigational stars, the planet 218, the Sun, etc. The example orientation module 204 may utilize the sensor 118 to map sensor data to a look-up table (e.g., a star catalog) to determine a position of the satellite 100. In some examples, the orientation module 204 calculates a vector to maximize an amount of light to which the solar panels 108 are exposed. The example orientation module 204 may calculate an instant (e.g., a current) secondary vector of the satellite 100. For example, the orientation module 204 may calculate a vector from a center of gravity of the satellite 100 to the Sun.

In some examples, the orientation module 204 determines an orbital reference frame plane based on the current primary vector of the satellite 100. In some examples, the orientation module 204 calculates a principle sensitive axis (e.g., the axis 116) of the satellite 100. In other examples, the orientation module 204 accesses mass/inertia data and/or a pre-defined sensitive axis of the satellite 100 from the database 214. In yet other examples, the sensitive principle axis is assigned (e.g., received from, continuously received from, uploaded from, etc.) the ground-based communication system 216. In some examples, the orientation module 204 calculates an attitude shift (e.g., an attitude delta) of the satellite 100 required to orient the principle sensitive axis of the satellite 100 to the orbital reference frame plane. Additionally or alternatively, the example orientation module 204 may calculate an attitude of the satellite 100 in which the principle sensitive axis is oriented to the orbital reference frame plane and a thrust vector of the satellite 100 is perpendicular to the principle sensitive axis to move the satellite 100 into the higher orbit while reducing (e.g., minimizing) gravity gradient torques acting on the satellite. Alternatively, the example orientation module 204 may be a manually controlled interface via the ground-based communication system 216. The example orientation module 204 may store data (e.g., orientation coordinates) in and/or retrieve data from the example database 214.

In the illustrated example of FIG. 2, the satellite controller 104 includes the steering law module 206 to generate an attitude representation of a desired satellite position. As used herein, the term "attitude representation" refers to a mathematical description of a desired satellite attitude. Example attitude representations may include a transformation matrix, a quaternion (e.g., a right-handed quaternion), an angle axis, Euler angles, Rodriguez parameters, etc. In some examples, the steering law module 206 generates a nominal primary vector, a nominal secondary vector, and a nominal boresight vector, where the nominal vectors represent commanded or desired vectors of one or more axes, components, etc. of the satellite 100. For example, the steering law module 206 may determine a nominal primary vector pointing from a center of gravity of the satellite 100 towards a target (e.g., a point on the Earth). The nominal vectors may be based on obtained vectors. For example, the steering law module 206 may obtain an instant (e.g., a current) primary vector and/or an instant boresight vector from the targeting module 202. The example steering law module 206 may obtain an instant secondary vector from the orientation module 204. The example steering law module 206 may perform vector calculations on the obtained vectors to generate the nominal vectors. The example steering law module 206 may generate the attitude representation of the satellite 100 based on the nominal vectors.

In some examples, the steering law module 206 generates a nominal normal vector. For example, the steering law module 206 may calculate a vector normal (e.g., a nominal normal vector) to both the nominal primary vector and the nominal secondary vector as described below in Equation (1):

$$\vec{v}_{norm} = \vec{v}_p \times \vec{v}_s \qquad \text{Equation (1)}$$

In the illustrated example of Equation (1) above, the variable $\vec{v}_{norm}$ represents a nominal normal vector, the variable $\vec{v}_p$ represents a nominal primary vector, and the variable $\vec{v}_s$ represents a nominal secondary vector.

In some examples, the steering law module 206 normalizes the nominal normal vector $\vec{v}_{norm}$ as described below in Equation (2):

$$\hat{v} = \frac{\vec{v}_{norm}}{\|\vec{v}_{norm}\|} \qquad \text{Equation (2)}$$

In the illustrated example of Equation (2) above, the variable $\hat{v}$ represents a nominal normal unit vector, and the variable $\vec{v}_{norm}$ represents the nominal normal vector. In some instances, the steering law module 206 creates an attitude representation triad for a target of interest (e.g., a point on the Earth) with respect to the inertial reference frame (e.g., the Earth). The example steering law module 206 may generate the attitude representation triad as described below in Equation (3) and Equation (4):

$$\vec{v}_3 = \vec{v}_p \qquad \text{Equation (3)}$$

$$\vec{v}_1 = \vec{v}_{norm} \times \vec{v}_p \qquad \text{Equation (4)}$$

In the illustrated example of Equation (3) above, the variable $\vec{v}_3$ represents a third vector of the attitude representation triad, and the variable $\vec{v}_p$ represents the primary vector. In the illustrated example of Equation (4) above, the variable $\vec{v}_{norm}$ represents the nominal normal vector as calculated above in Equation (1), and the variable $\vec{v}_p$ represents the primary vector. In the illustrated example of Equation (4) above, the variable $\vec{v}_1$ represents a first vector of the attitude representation triad based on a vector cross-product between $\vec{v}_{norm}$ and $\vec{v}_p$.

To complete the attitude representation triad, the example steering law module 206 may calculate a second vector $\vec{v}_2$ based on $\vec{v}_1$ and $\vec{v}_3$ as determined by Equation (3) and Equation (4) above. The example steering law module 206 may calculate $\vec{v}_2$ as described below in Equation (5):

$$\vec{v}_2 = \vec{v}_3 \times \vec{v}_1 \qquad \text{Equation (5)}$$

The example steering law module 206 may generate the attitude representation using a transformation matrix (e.g., a direction cosine matrix) as described below in Equation (6):

$$C^{tI} = \begin{bmatrix} \vec{v}_1^1 & \vec{v}_1^2 & \vec{v}_1^3 \\ \vec{v}_2^1 & \vec{v}_2^2 & \vec{v}_2^3 \\ \vec{v}_3^1 & \vec{v}_3^2 & \vec{v}_3^3 \end{bmatrix} \qquad \text{Equation (6)}$$

In the illustrated example of Equation (6), the variable $C^{tI}$ represents a direction cosine matrix that transforms vectors specified in an inertial frame I to a target frame t. In the illustrated example of Equation (6), the superscript of the vectors in the matrix represent the first, second, and third element of the vector specified by the subscript. For example, the variable $\vec{v}_2^1$ represents the first element of the vector $\vec{v}_2$.

In some examples, the boresight vector $\vec{v}_{bs}$ is not aligned with a geometric body frame axis (e.g., an axis of the satellite body 102). The example steering law module 206 may perform a second rotation to derive a full rotation tensor that transforms vectors from the inertial frame to the body frame as described below in Equation (7):

$$C^{BI} = C^{Bt} C^{tI} \qquad \text{Equation (7)}$$

In the illustrated example of Equation (7) above, the variable $C^{BI}$ represents a direction cosine matrix of the body frame (e.g., the satellite body 102) with respect to the inertial frame (e.g., the target on the planet 218). In the illustrated example of Equation (7) above, the variable $C^{Bt}$ represents a direction cosine matrix of the body frame with respect to the boresight frame, and the variable $C^{tI}$ is described above in Equation (6). The example steering law module 206 may transmit the direction cosine matrices as described above in Equation (6) and Equation (7) to the example attitude controller 208 to maneuver the satellite 100.

In some examples, the steering law module 206 calculates a set of alternate vectors to minimize command dynamics due to a singularity. For example, the steering law module 206 may calculate a nominal normal vector $\vec{n}_{nominal}$, and an adjusted normal vector $\vec{n}_{adjusted}$ based on the set of nominal vectors, the set of alternate vectors, and/or a combination thereof. For example, the steering law module 206 may calculate the nominal normal vector $\vec{n}_{nominal}$ of the satellite 100 as described below in Equation (8):

$$\vec{n}_{nominal} = \vec{v}_p \times \vec{v}_s \qquad \text{Equation (8)}$$

In the illustrated example of Equation (8) above, the variable $\vec{n}_{nominal}$ represents a nominal normal vector, the variable $\vec{v}_p$ represents a nominal primary vector, and the variable $\vec{v}_s$ represents a nominal secondary vector. In the illustrated example of Equation (8) above, the nominal normal vector $\vec{n}_{nominal}$ is equal to a cross-product of the nominal primary vector $\vec{v}_p$ and the nominal secondary vector $\vec{v}_s$, or normal to $\vec{v}_p$ and $\vec{v}_s$. In the illustrated example of Equation (8) above, $\vec{n}_{nominal}$ is equal to the nominal normal vector $\vec{v}_{norm}$ as described above in Equation (1). Alternatively, the nominal normal vector $\vec{n}_{nominal}$ may be equal to a vector cross-product of a primary vector and a secondary vector not described above in Equation (1).

In some examples, the steering law module 206 calculates the alternate normal vector $\vec{n}_{alternate}$, which may be used as an alternative to the nominal normal vector $\vec{n}_{nominal}$. The example steering law module 206 may calculate $\vec{n}_{alternate}$, where $\vec{n}_{alternate}$ is normal to the primary vector $\vec{n}_p$ as described above in Equation (1), but not necessarily normal to the secondary vector $\vec{n}_s$ as described above in Equation (1). Alternatively, $\vec{n}_{alternate}$ may be normal to $\vec{n}_s$.

In some examples, the steering law module 206 calculates $\vec{n}_{alternate}$ by determining an intersection of two planes (e.g., geometric planes) and a direction (e.g., a vector direction). In response to determining the intersection, the example steering law module 206 may determine an ideal $\vec{n}_{alternate}$, where the ideal $\vec{n}_{alternate}$ produces minimum slew. For example, the steering law module 206 may define a first geometric plane that is normal to $\vec{v}_p$. The steering law module 206 may define a second geometric plane that is normal to the direction of $\vec{v}_{norm}$ as vectors $\vec{v}_p$ and $\vec{v}_s$ approach a separation extremum or a singularity point. The example steering law module 206 may determine a direction of a vector along a line formed by the first and second geometric planes, where the direction is chosen to produce a minimum angle between $\vec{n}_{nominal}$ and $\vec{n}_{alternate}$. The example steering law module 206 may use $\vec{n}_{alternate}$ as an aid for producing $\vec{n}_{adjusted}$, therefore the steering law module 206 automatically projects $\vec{n}_{alternate}$ to be perpendicular to $\vec{n}_p$. Thus, $\vec{n}_{alternate}$ provides a midpoint between the attitudes equidistant in time before and after a separation extremum.

In some examples, the steering law module 206 determines that an exact calculation of $\vec{n}_{alternate}$ is not necessary, as any vector that satisfies the first example criterion and is less than 90 degrees from the nominal normal vector $\vec{n}_{nominal}$ is a satisfactory choice for $\vec{n}_{alternate}$. As a result, a sensitivity of $\vec{n}_{alternate}$ may not be significant. In some examples, the steering law module 206 calculates $\vec{n}_{alternate}$ to provide a midpoint between a first attitude for the duration of time t prior to the singularity and a second attitude for the same duration of time t after the singularity. For example, the steering law module 206 may calculate $\vec{n}_{alternate}$ to be a vector normal to an orbital plane of the satellite 100.

In some examples, the steering law module 206 estimates when a singularity occurs. For example, a singularity may occur when an angular separation between the nominal primary vector $\vec{n}_p$ and the nominal secondary vector $\vec{n}_s$ is at a minimum angular separation (e.g., approximately 0 degrees), or at a maximum angular separation (e.g., approximately 180 degrees). However, calculating an angular separation extremum (e.g., a minimum or a maximum angular separation) may be difficult due to one or more considerations when calculating $\vec{n}_p$, $\vec{n}_s$, etc. For example, $\vec{n}_p$ may be a function of an orbit (e.g., a GEO), an orbital position, a random vector chosen at any time by a user, etc. of the satellite 100. In another example, $\vec{n}_s$ may be a function of the orbit, the orbital position, a user chosen direction (e.g., a sun vector, a moon vector, a relay asset vector, etc.) of the satellite 100. As a result, the example steering law module 206 may determine that the angular separation extremum exists between any interval less than and including [0, 180] degrees, therefore the minimum angular separation and/or the maximum angular separation cannot be hardcoded in the steering law module 206.

Alternatively, the example steering law module 206 may simulate an orbit geometry, one or more nominal vectors (e.g., $\vec{n}_p$, $\vec{n}_s$, etc.), etc. prior to executing an attitude command. However, the example steering law module 206 performing a simulation prior to execution may impose implementation restrictions, introduce operation complexities, increase power consumption of the satellite controller 104, etc. However, the examples disclosed herein illustrate apparatus, methods, and articles of manufacture that do not require the example steering law module 206 to perform simulations prior to execution.

In some examples, the steering law module 206 calculates the angular separation extrema in real-time operation. Alternatively, the example steering law module 206 may calculate the angular separation extrema in non-real-time operation (e.g., an offline mode of operation). The example steering law module 206 may calculate the angular separation extrema in real-time operation by transforming $\vec{n}_p$ and $\vec{n}_s$ into transformed vectors corresponding to an orbit fixed frame plane defined via a position vector and/or a velocity vector of a space vehicle (e.g., the satellite 100). As used herein, the term "orbit fixed frame plane" refers to a plane normal to a vector produced by a cross-product of a position vector and a velocity vector. The example steering law module 206 may choose an orbit fixed frame plane because it may be desirable to capture a motion of and $\vec{n}_p$ and $\vec{n}_s$ with respect to the motion of the satellite 100. The example steering law module 206 may project the transformed vectors onto the orbit fixed frame plane subtended by the position vector and/or the velocity vector of the satellite 100.

The transformed, projected vectors may include $\vec{v}_p^{proj}$ and $\vec{v}_s^{proj}$, where $\vec{v}_p^{proj}$ represents the transformed, projected primary vector onto the orbital fixed frame plane, and $\vec{v}_s^{proj}$ represents the transformed, projected secondary vector onto the orbital fixed frame plane. The example steering law module 206 may compute a normal projected vector to the projected vectors via (1) a cross product of the projected vectors, and (2) an angle, $\theta_{proj}$, between the projected vectors.

In some examples, the steering law module 206 determines to toggle a sign of the nominal normal vector $\vec{n}_{nominal}$ when one or more components of the projected vectors (e.g., the normal projected vector) are outside the orbit fixed frame plane. For example, the steering law module 206 may toggle a positive sign of $\vec{n}_{nominal}$ to a negative sign when a component of the normal projected vector is outside the orbit fixed frame plane. In some instances, a user (e.g., an operator) may manually toggle the sign of $\vec{n}_{nominal}$ such that the user controls whether $\vec{n}_{nominal}$ is above or below the orbit fixed frame plane. Additionally or alternatively, the user may override a change in sign of $\vec{n}_{nominal}$ by the example steering law module 206. In some examples, the steering law module 206 flips the sign of $\vec{n}_{nominal}$ precisely when the satellite 100 experiences an angular separation extremum to prevent the attitude controller 208 from generating a large, potentially unstable, step command (e.g., a step attitude command).

In some instances, the steering law module 206 calculates the adjusted normal vector $\vec{n}_{adjusted}$ based on the set of nominal vectors, the set of alternate vectors, and/or a combination thereof. For example, the steering law module 206 may use a weight factor, a, to determine a contribution of the set of nominal vectors and/or a contribution of the set of alternate vectors to calculate $\vec{n}_{adjusted}$. In some instances, $\alpha$ is limited to values within a range [0,1]. Alternatively, a may have a value outside the range [0,1]. In some examples, the steering law module 206 calculates $\vec{n}_{adjusted}$ using a linear method as described below in Equation (9):

$$\vec{n}_{adjusted} = ((1-\alpha)*\vec{n}_{alternate}) + (\alpha*\vec{n}_{nominal}) \qquad \text{Equation (9)}$$

In the illustrated example of Equation (9) above, the variable $\vec{n}_{adjusted}$ represents the adjusted normal vector, the variable $\alpha$ represents the weight factor, the variable $\vec{n}_{alternate}$ represents the alternate normal vector, and the variable $\vec{n}_{nominal}$ represents the nominal normal vector. In some examples, each of the vectors described above in Equation (9) are unit vectors and/or are required to be specified in the same coordinate frame. In some instances, the steering law module 206 renormalizes $\vec{n}_{adjusted}$ after the steering law module 206 calculates $\vec{n}_{adjusted}$ as described above in Equation (9). Additionally or alternatively, the example steering law module 206 may calculate $\vec{n}_{adjusted}$ using any other method such as, for example, an exponential method, a random-value generation method, a sinusoidal method, etc.

The example steering law module 206 may calculate $\alpha$ using various mathematical methods. The example steering law module 206 may determine to use a particular method or a combination of methods dependent on one or more factors such as, for example, processing power available to the steering law module 206, latency time requirements for updating parameters of the satellite controller 104, etc. An example method to calculate α may be a linear method as described below in Equation (10):

$$\alpha = \left| 2 * \left( \frac{\theta_{proj}}{\pi} - \text{floor}\left( \frac{\theta_{proj}}{\pi} + 0.5 \right) \right) \right|  \quad \text{Equation (10)}$$

In the illustrated example of Equation (10) above, the variable α represents the weight factor, and the variable $\theta_{proj}$ represents the angle between the projected vectors onto the orbit fixed frame plane (e.g., the angle between $\vec{v}_p^{proj}$ and $\vec{v}_s^{proj}$). In the illustrated example of Equation (10) above, the floor function truncates the decimal of the quantity indicated. The example steering law module 206 may utilize the linear method as described above in Equation (10) to minimize resulting command dynamics while still transitioning fully between the set of nominal vectors and the set of alternate vectors. In the illustrated examples of Equation (9) and Equation (10) above, the steering law module 206 utilizes the set of nominal vectors (e.g., utilizes the nominal normal vector) at 90 and 180 degrees, while utilizing the set of alternate vectors (e.g., utilizes the alternate normal vector) at 0 and 180 degrees. For example, α=1 when $\theta_{proj}$=90 degrees, resulting in $\vec{n}_{adjusted} = \vec{n}_{nominal}$.

In some examples, the steering law module 206 may calculate α using a sinusoidal method as described below in Equation (11):

$$\alpha = \frac{1 - \cos(2 * \theta_{proj})}{2}  \quad \text{Equation (11)}$$

In the illustrated example of Equation (11) above, the variable α represents the weight factor, and the variable $\theta_{proj}$ represents the angle between $\vec{v}_p^{proj}$ and $\vec{v}_s^{proj}$. In the illustrated example of Equation (11) above, α changes sinusoidally within the range [0,1] based on $\theta_{proj}$. In the illustrated example of Equation (9) and Equation (11) above, the steering law module 206 utilizes the set of nominal vectors at 90 and 270 degrees, while utilizing the set of alternate vectors at 0 and 180 degrees.

In some instances, the steering law module 206 calculates α using an exponential method as described below in Equation (12):

$$\alpha = \| \vec{v}_p^{proj} \times \vec{v}_s^{proj} \|^x  \quad \text{Equation (12)}$$

In the illustrated example of Equation (12) above, the variable α represents the weight factor, the variable $\vec{v}_p^{proj}$ represents the primary vector projected onto the orbit fixed frame plane, and the variable $\vec{v}_s^{proj}$ represents the secondary vector projected onto the orbit fixed frame plane. In the illustrated example of Equation (12) above, the variable x represents a tuning parameter that determines a sharpness of the transition from the set of nominal vectors to the set of the alternate vectors. In the illustrated example of Equation (12) above, α is calculated based on the cross product between the projected vectors raised to the x power. The example steering law module 206 may utilize the exponential method to transition between the set of nominal vectors to the set of alternate vectors at an exact time that the set of nominal vectors are at or near a singularity condition.

In some examples, the steering law module 206 utilizes the exponential method to calculate a value of α that maximizes an alignment of an axis (e.g., the axis 116) of the satellite 100, the satellite body 102, etc. to the nominal secondary vector. For example, the steering law module 206 may use the exponential method to maximize an amount of power generated by the solar panels 108 due to an alignment of one or more components of the satellite 100 to the nominal secondary vector. However, the example steering law module 206 may generate an attitude representation (e.g., a transformation matrix) using the exponential method that results in high command dynamics.

In some examples, the steering law module 206 assigns a value to α to disable flip prevention. For example, the steering law module 206 may assign α=1 to turn off mitigating and/or preventative measures to a singularity (e.g., singularity handling). For example, $\vec{n}_{adjusted} = \vec{n}_{nominal}$ as described above in Equation (9) when α=1. The example steering law module 206 may turn off singularity handling in sun-synchronous orbits. In another example, the steering law module 206 may assign α=0 to turn off singularity handling. By assigning α=0, the example steering law module 206 generates an attitude representation solely via $\vec{n}_{alternate}$. For example, $\vec{n}_{adjusted} = \vec{n}_{alternate}$ as described above in Equation (9) when α=0. In the illustrated example, when the steering law module 206 calculates an ideal vector for $\vec{n}_{alternate}$ (e.g., a vector normal to the orbital plane), the steering law module 206 generates an attitude representation corresponding to standard orbit normal steering, where an axis (e.g., the axis 116) of a space vehicle (e.g., the satellite 100) is aligned with the orbital frame. Additionally or alternatively, a user may flip a sign of $\vec{n}_{nominal}$ prior to the example steering law module 206 calculating α using one or more methods such as, for example, the linear method, the sinusoidal method, and/or the exponential method as described above. Additionally or alternatively, a user may flip a sign of $\vec{n}_{adjusted}$ to generate an attitude representation corresponding to a space vehicle rotating 180 degrees about a nominal primary vector of the space vehicle. Additionally or alternatively, a user may change a value of α as calculated by the example steering law module 206.

In some instances, a range of values for α is limited to a smaller range than [0,1]. The example steering law module 206 may manipulate α to limit an angular displacement from a nominal normal vector solution with respect to an alternate normal vector solution, or vice versa. For example, the steering law module 206 may manipulate α to enable a space vehicle to slew about a target vector (e.g., a nominal primary vector) by no more than 30 degrees away from orbit normal (e.g., an alternate normal vector). The example steering law module 206 may limit the range to reduce a maximum transition between the set of nominal vectors and the set of alternate vectors. However, a prior simulation of a space vehicle or a constellation (i.e., a related group) of space vehicles for a given orbit may be required to determine an acceptable limited range for α. Alternatively, the example steering law module 206 may calculate (e.g., iteratively calculate) a separation angle between a desired trajectory and a current trajectory of the space vehicle based on $\vec{n}_{adjusted}$ including components from the set of nominal vectors, the set of alternate vectors, and/or a combination thereof. The example steering law module 206 may determine a value for α based on the separation angle, where the separation angle may be a minimum angle, a maximum angle, etc.

In response to the example steering law module 206 calculating a value for $\vec{n}_{adjusted}$, the steering law module 206 determines an attitude representation as described above. For example, the steering law module 206 may determine a transformation matrix representation based on setting $\vec{v}_{norm} = \vec{n}_{adjusted}$. The example steering law module 206 may convert the transformation matrix to another format (e.g., quaternion, Euler angles, etc.) based on a format or input requirement for the attitude controller 208. For example, the steering law module 206 may convert the transformation matrix into an attitude quaternion (e.g., a right-handed quaternion where a last element of the quaternion is a scalar element). As used herein, the term "attitude quaternion" is a four-element vector that may be used to encode any rotation in a 3-D coordinate system. The example steering law module 206 may transmit the resulting attitude quaternion to the attitude controller 208 to issue one or more appropriate torque commands to slew a space vehicle. The example steering law module 206 may store data (e.g., components of vectors, weight factors, etc.) in and/or retrieve data from the example database 214.

In the illustrated example of FIG. 2, the satellite controller 104 includes the attitude controller 208 to generate a torque command to maneuver a space vehicle. The example attitude controller 208 may obtain an attitude representation such as, for example, a transformation matrix, an attitude quaternion, etc. from the example steering law module 206 and/or from the example database 214. In some examples, the attitude controller 208 zeros an attitude error of a space vehicle. For example, the attitude controller 208 may obtain (1) a current position of the satellite 100 from the orientation module 204, and (2) a desired position of the satellite 100 from the steering law module 206 (e.g., a desired position based on an attitude representation). The example attitude controller 208 may calculate a difference between the current position and the desired position, where the difference is the attitude error. The example attitude controller 208 may zero out the attitude error by generating a torque command and transmitting the torque command to the satellite thruster(s) 112 and/or a momentum device of the satellite 100 to achieve the desired position. The example attitude controller 208 may store data (e.g., attitude commands) in and/or retrieve data from the example database 214.

In the illustrated example of FIG. 2, the satellite controller 104 includes the sensor interface 210 to determine a position and/or an attitude of a space vehicle. For example, the sensor interface 210 may determine a position, an attitude, an acceleration vector, and/or a velocity vector of the satellite 100 based on sensor data and/or received sensor data from the ground-based communication system 216 of the planet 218. The example sensor interface 210 may obtain sensor data from sensors monitoring the propulsion system 110, the thruster(s) 112, etc. The example sensor interface 210 may store data (e.g., sensor data) in and/or retrieve data from the example database 214.

In the illustrated example of FIG. 2, the satellite guidance system 200 includes the database 214 to record data (e.g., an attitude representation, sensor data, a weight factor, etc.). The example database 214 may respond to queries for information related to data in the database 214. For example, the database 214 may respond to queries for additional data by providing the additional data (e.g., the one or more data points), by providing an index associated with the additional data in the database 214, etc. The example database 214 may additionally or alternatively respond to queries when there is no additional data in the database 214 by providing a null index, an end of database 214 identifier, etc. The example database 214 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 214 may additionally or alternatively be implemented by one or more double data rate (DDR) memories, such as DDR, DDR2, DDR3, mobile DDR (mDDR), etc. The example database 214 may additionally or alternatively be implemented by one or more mass storage devices such as hard disk drive(s), compact disk drive(s) digital versatile disk drive(s), magnetic media, etc. While in the illustrated example the database 214 is illustrated as a single database, the database 214 may be implemented by any number and/or type(s) of databases.

While an example manner of implementing the satellite controller 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example targeting module 202, the example orientation module 204, the example steering law module 206, the example attitude controller 208, the example sensor interface 210 and/or, more generally, the example satellite controller 104 of FIG. 2 may be implemented by hardware, software, firmware, and/or any combination of hardware, software, and/or firmware. Thus, for example, any of the example targeting module 202, the example orientation module 204, the example steering law module 206, the example attitude controller 208, the example sensor interface 210 and/or, more generally, the example satellite controller 104 of FIG. 2 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example targeting module 202, the example orientation module 204, the example steering law module 206, the example attitude controller 208, the example sensor interface 210 and/or, more generally, the example satellite controller 104 of FIG. 2 is/are hereby expressly defined to include a tangible computer-readable storage device or storage disk such as a memory, a digital versatile disk (DVD), a compact disk (CD), a Blu-ray disk, etc. storing the software, and/or firmware. Further still, the example satellite controller 104 of FIG. 2 may include one or more elements, processes, and/or devices in addition to, or instead of, those illustrated in FIG. 2, and/or may include more than one of any or all of the illustrated elements, processes, and devices.

Figure 3A:
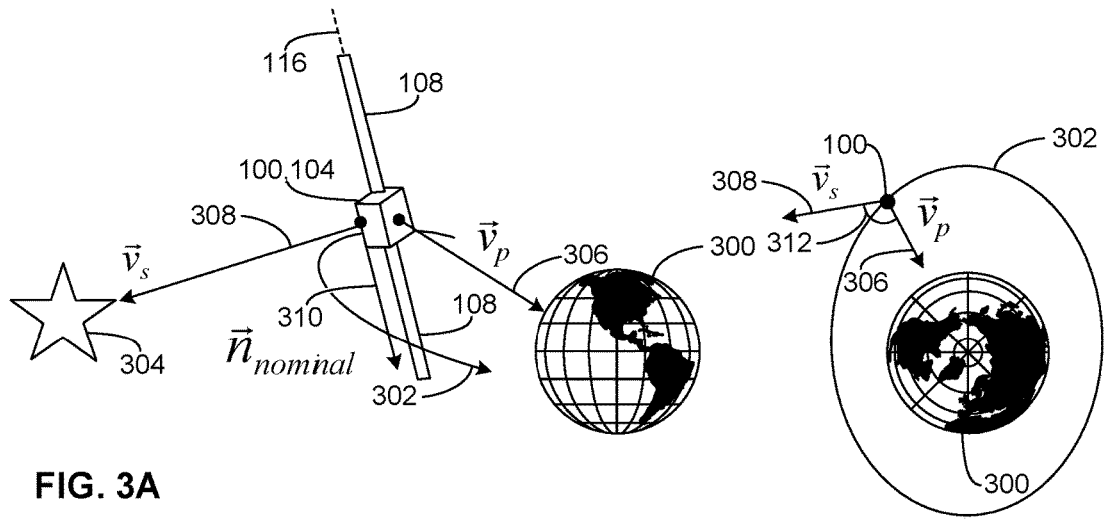
FIGS. 3A, 3B, and 3C illustrate example vectors and planes of an example orbit of the example satellite of FIG. 1 in accordance with typical attitude steering laws.
Figure 3B:
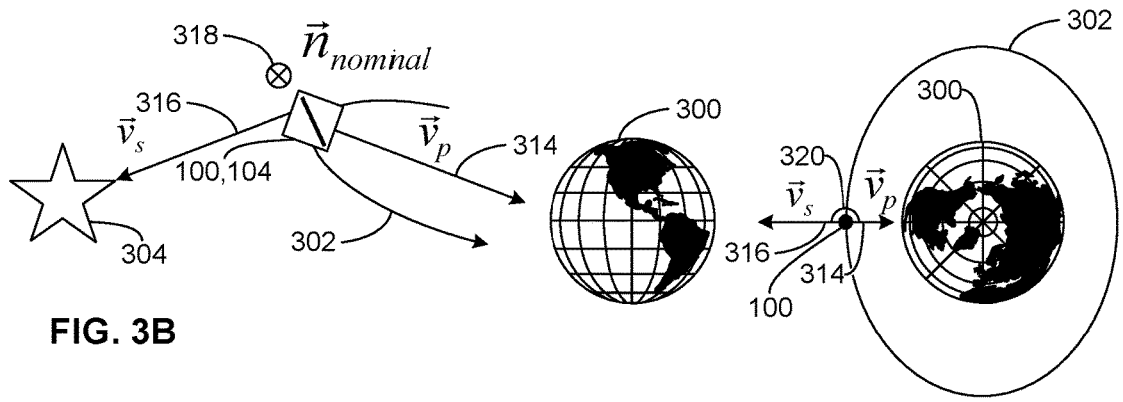
Figure 3C:
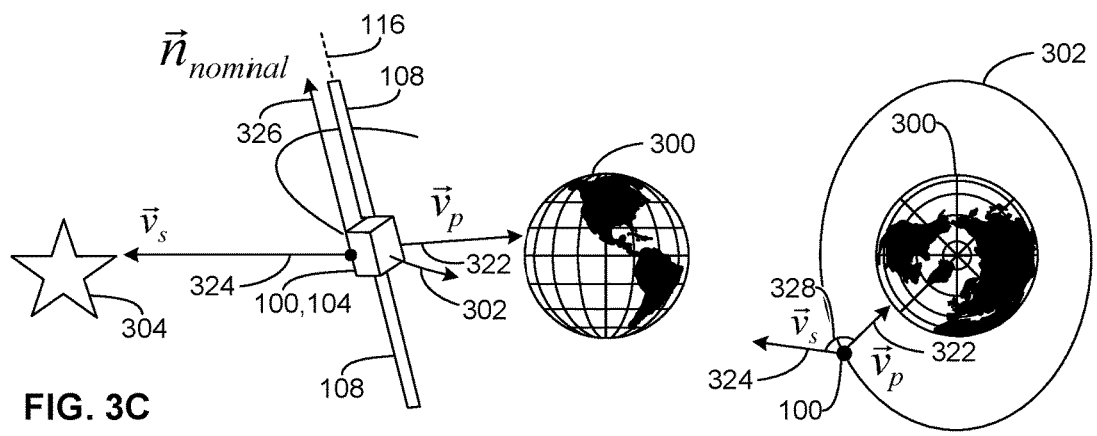

FIGS. 3A, 3B, and 3C are schematic illustrations depicting example vectors and planes of an example orbit of the example satellite 100 of FIG. 1 in accordance with typical attitude steering laws. In the illustrated example of FIG. 3A, the satellite 100 of FIG. 1 orbits a planet 300 along an orbital path 302. The satellite 100 may align the axis 116 of the solar panels 108 of FIG. 1 along a vector to maximize exposure to a power source 304 (e.g., a star, the Sun, etc.). In the illustrated example, the satellite controller 104 of FIGS. 1-2 calculates a nominal primary vector 306 (e.g., $\vec{v}_p$), a nominal secondary vector 308 (e.g., $\vec{v}_s$), and a nominal normal vector 310 (e.g., $\vec{n}_{nominal}$). For example, the steering law module 206 may generate the nominal normal vector 310 by calculating a vector cross-product of the nominal primary vector 306 and the nominal secondary vector 308. As shown in the illustrated example, an angle 312 between the nominal primary vector 306 and the nominal secondary vector 308 is not approximately 0 or 180 degrees. Thus, the example attitude controller 208 may generate an attitude command based on the nominal normal vector 310 when the satellite 100 is not experiencing a singularity condition. In the illustrated example of FIG. 3A, the attitude command does not instruct the satellite 100 to perform a rotation about the nominal primary vector 306 (e.g., perform a yaw flip).

In the illustrated example of FIG. 3B, the satellite 100 of FIG. 1 orbits the planet 300 along the orbital path 302. In the illustrated example, the satellite controller 104 of FIGS. 1-2 calculates a nominal primary vector 314 (e.g., $\vec{v}_p$), a nominal secondary vector 316 (e.g., $\vec{v}_s$), and a nominal normal vector 318 (e.g., $\vec{n}_{nominal}$). For example, the steering law module 206 may generate the nominal normal vector 318 by calculating a vector cross-product of the nominal primary vector 314 and the nominal secondary vector 316. As shown in the illustrated example, an angle 320 between the nominal primary vector 314 and the nominal secondary vector 316 is approximately 180 degrees. Thus, the example attitude controller 208 may generate an attitude command based on the nominal normal vector 318 when the satellite 100 is experiencing a singularity condition. In the illustrated example of FIG. 3B, the attitude command instructs the satellite 100 to perform a rotation about the nominal primary vector 306 (e.g., perform a yaw flip).

In the illustrated example of FIG. 3C, the satellite 100 of FIG. 1 orbits the planet 300 along the orbital path 302. In the illustrated example, the satellite controller 104 of FIGS. 1-2 calculates a nominal primary vector 322 (e.g., $\vec{v}_p$), a nominal secondary vector 324 (e.g., $\vec{v}_s$) and a nominal normal vector 326 (e.g., $\vec{v}_{nominal}$). For example, the steering law module 206 may generate the nominal normal vector 326 by calculating a vector cross-product of the nominal primary vector 322 and the nominal secondary vector 324. The nominal normal vector 326 is opposite in direction to the nominal normal vector 310 of FIG. 3A due to the yaw flip performed in FIG. 3B. As shown in the illustrated example, an angle 328 between the nominal primary vector 322 and the nominal secondary vector 324 is not approximately 0 or 180 degrees. Thus, the example attitude controller 208 may generate an attitude command based on the nominal normal vector 326 when the satellite 100 is not experiencing a singularity condition. In the illustrated example of FIG. 3C, the attitude command does not instruct the satellite 100 to perform a rotation about the nominal primary vector 322 (e.g., perform a yaw flip).

Figure 4A:
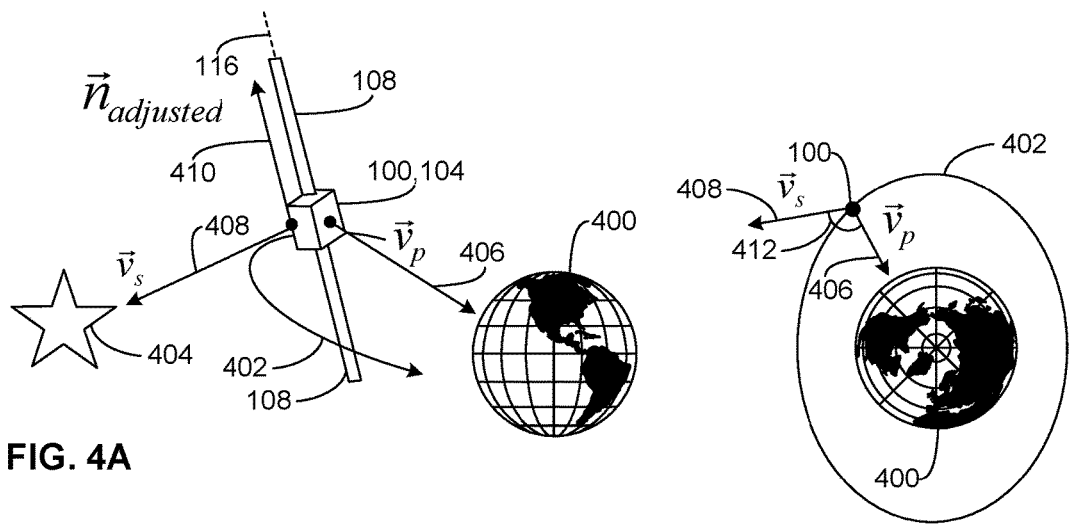
FIGS. 4A, 4B, and 4C illustrate example vectors and planes of an example orbit of the example satellite of FIG. 1 in accordance with the teachings of this disclosure.
Figure 4B:
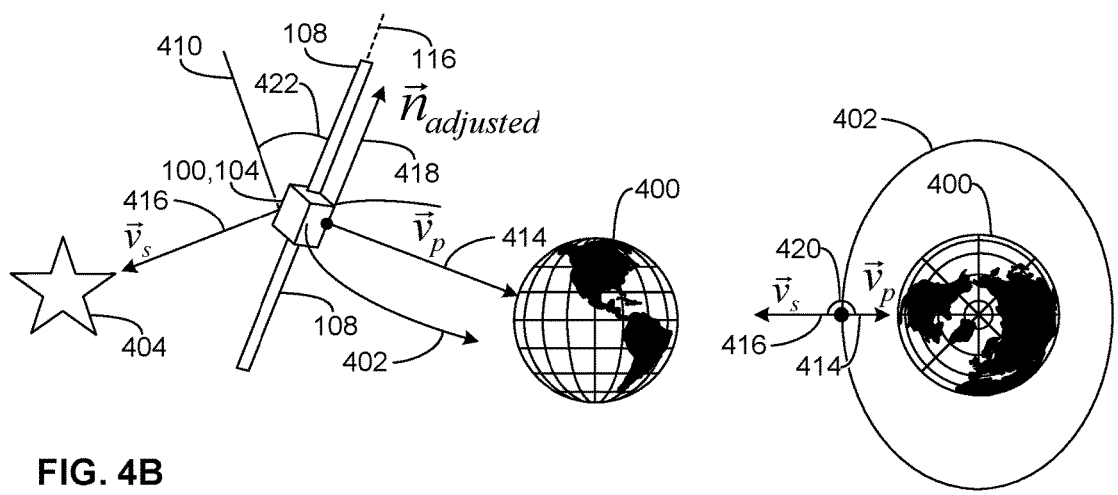
Figure 4C:
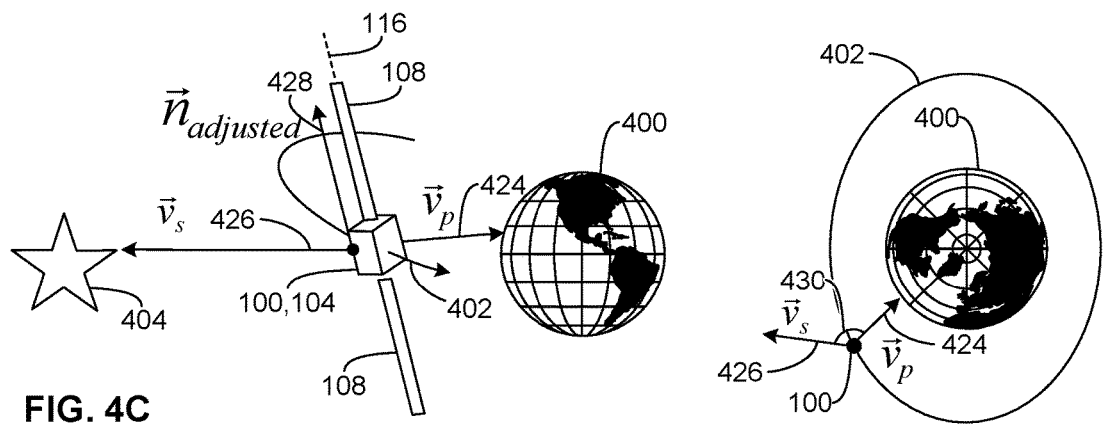

FIGS. 4A, 4B, and 4C are schematic illustrations depicting example vectors and planes of an example orbit of the example satellite 100 of FIG. 1 in accordance with the example steering law module 206 calculating a set of alternate vectors. In the illustrated example of FIG. 4A, the satellite 100 of FIG. 1 orbits a planet 400 along an orbital path 402. The satellite 100 may align the axis 116 of the solar panels 108 of FIG. 1 along a vector to maximize exposure to a power source 404 (e.g., a star, the Sun, etc.). In the illustrated example, the satellite controller 104 of FIGS. 1-2 calculates a nominal primary vector 406 (e.g., $\vec{v}_p$), a nominal secondary vector 408 (e.g., $\vec{v}_s$), and an adjusted normal vector 410 (e.g., $\vec{n}_{adjusted}$). For example, the steering law module 206 may generate the adjusted normal vector 410 by a method as described above in accordance with Equations (9)-(12). For example, the steering law module 206 may generate the adjusted normal vector 410 based on the weight factor α. The adjusted normal vector 410 is opposite in sign with respect to the nominal normal vector 310 of FIG. 3A. For example, the steering law module 206 may have toggled a sign of a nominal normal vector based on a vector cross-product of the nominal primary vector 406 and the nominal secondary vector 408.

In the illustrated example of FIG. 4A, an angle 412 between the nominal primary vector 406 and the nominal secondary vector 408 is not approximately 0 or 180 degrees. Thus, the example attitude controller 208 may generate an attitude command based on the adjusted normal vector 410 when the satellite 100 is not experiencing a singularity condition. In the illustrated example of FIG. 4A, the attitude command does not instruct the satellite 100 to perform a rotation about the nominal primary vector 406 (e.g., perform a yaw flip). The adjusted normal vector 410 may include the set of nominal vectors, the set of alternate vectors, and/or a combination thereof based on the weight factor α as described above. Alternatively, the adjusted normal vector 410 may be equal to a nominal normal vector (e.g., $\vec{n}_{nominal}$) or an alternate normal vector (e.g., $\vec{n}_{alternate}$).

In the illustrated example of FIG. 4B, the satellite 100 of FIG. 1 orbits the planet 400 along the orbital path 402. In the illustrated example, the satellite controller 104 of FIGS. 1-2 calculates a nominal primary vector 414 (e.g., $\vec{v}_p$), a nominal secondary vector 416 (e.g., $\vec{v}_s$), and an adjusted normal vector 418 (e.g., $\vec{n}_{adjusted}$). For example, the steering law module 206 may generate the adjusted normal vector 418 by a method as described above in accordance with Equations (9)-(12). For example, the steering law module 206 may generate the adjusted normal vector 418 based on the weight factor α.

In the illustrated example of FIG. 4B, an angle 420 between the nominal primary vector 414 and the nominal secondary vector 416 is approximately 180 degrees. Thus, the example attitude controller 208 may generate an attitude command based on the adjusted normal vector 418 when the satellite 100 is experiencing a singularity condition. However, in the illustrated example of FIG. 4B, the attitude command does not instruct the satellite 100 to perform a rotation about the nominal primary vector 414 (e.g., perform a yaw flip). The adjusted normal vector 418 may include the set of nominal vectors, the set of alternate vectors, and/or a combination thereof based on the weight factor α as described above. Alternatively, the adjusted normal vector 418 may be equal to an alternate normal vector (e.g., $\vec{n}_{alternate}$). As a result, the satellite 100 orients the axis 116 of the solar panels 108 along the adjusted normal vector 418 at an angle 422 from the adjusted normal vector 410 of FIG. 4A. By calculating a set of alternate vectors, the satellite 100 avoids performing an unintentional yaw flip as described above in FIG. 3B when the satellite 100 approaches or experiences a singularity condition (e.g., a minimum or maximum angular separation exists).

In the illustrated example of FIG. 4C, the satellite 100 of FIG. 1 orbits the planet 400 along the orbital path 402. In the illustrated example, the satellite controller 104 of FIGS. 1-2 calculates a nominal primary vector 424 (e.g., $\vec{v}_p$), a nominal secondary vector 426 (e.g., $\vec{v}_s$), and an adjusted normal vector 428 (e.g., $\vec{n}_{adjusted}$) For example, the steering law module 206 may generate the adjusted normal vector 428 by a method as described above in accordance with Equations (9)-(12). For example, the steering law module 206 may generate the adjusted normal vector 428 based on the weight factor α.

In the illustrated example of FIG. 4C, an angle 430 between the nominal primary vector 424 and the nominal secondary vector 426 is not approximately 0 or 180 degrees. Thus, the example attitude controller 208 may generate an attitude command based on the adjusted normal vector 428 when the satellite 100 is not experiencing a singularity condition. In the illustrated example of FIG. 4C, the attitude command does not instruct the satellite 100 to perform a rotation about the nominal primary vector 424 (e.g., perform a yaw flip). The adjusted normal vector 428 may include the set of nominal vectors, the set of alternate vectors, and/or a combination thereof based on the weight factor α as described above. Alternatively, the adjusted normal vector 428 may be equal to a nominal normal vector (e.g., $\vec{n}_{nominal}$) or an alternate normal vector (e.g., $\vec{n}_{alternate}$).

Figure 5:
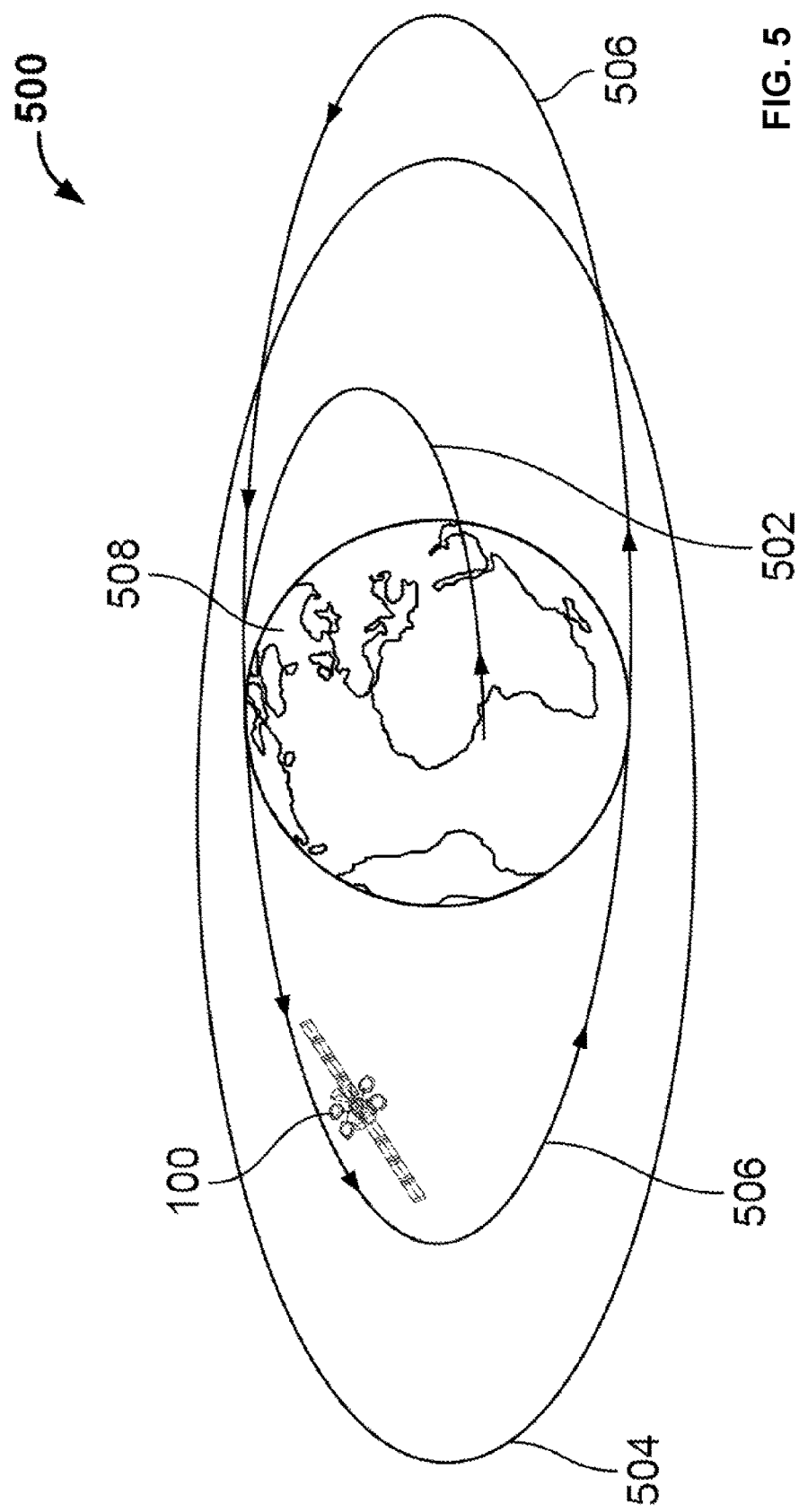
FIG. 5 is an example orbital pathway diagram of the example satellite of FIG. 1 moving from an initial orbit to a final orbit via a transfer orbit.

FIG. 5 is an example orbital pathway diagram 500 of the example satellite 100 of FIG. 1 moving from an initial orbit 502 to a final orbit 504 via a transfer orbit 506. In the illustrated example of FIG. 5, the satellite 100 orbits a celestial body or a planet (e.g., Earth, Mars, etc.) 508 in the initial orbit 502 and is proceeding to the final orbit 504. In this example, the satellite 100 begins its travel along the transfer orbit 506 by performing an initial maneuver using the thrusters 112. As the satellite 100 moves from the initial orbit 502 to the final orbit 504, the satellite 100 moves along a path defined by the transfer orbit 506 and uses the thrusters 112 to perform a final maneuver to remain in the final orbit 504. While the example shown in the orbital pathway diagram 500 depicts the satellite 100 moving from the lower initial orbit 502 to the higher final orbit 504, in some examples, the satellite 100 does not complete the final maneuver to move into the higher final orbit 504, thereby causing the satellite 100 to orbit along the transfer orbit 506. Alternatively, the satellite 100 may proceed from the final orbit 504 to the lower/initial orbit 502. It will be appreciated that the satellite 100 may travel in the initial orbit 502, the final orbit 504, the transfer orbit 506, etc. by using a set of nominal vectors, a set of alternate vectors, and/or a combination thereof as calculated by the satellite controller 104 of FIGS. 1-2. For example, the satellite 100 may travel in the initial orbit 502 using the set of alternate vectors as calculated by the example steering law module 206 of FIG. 2.

Figure 6:
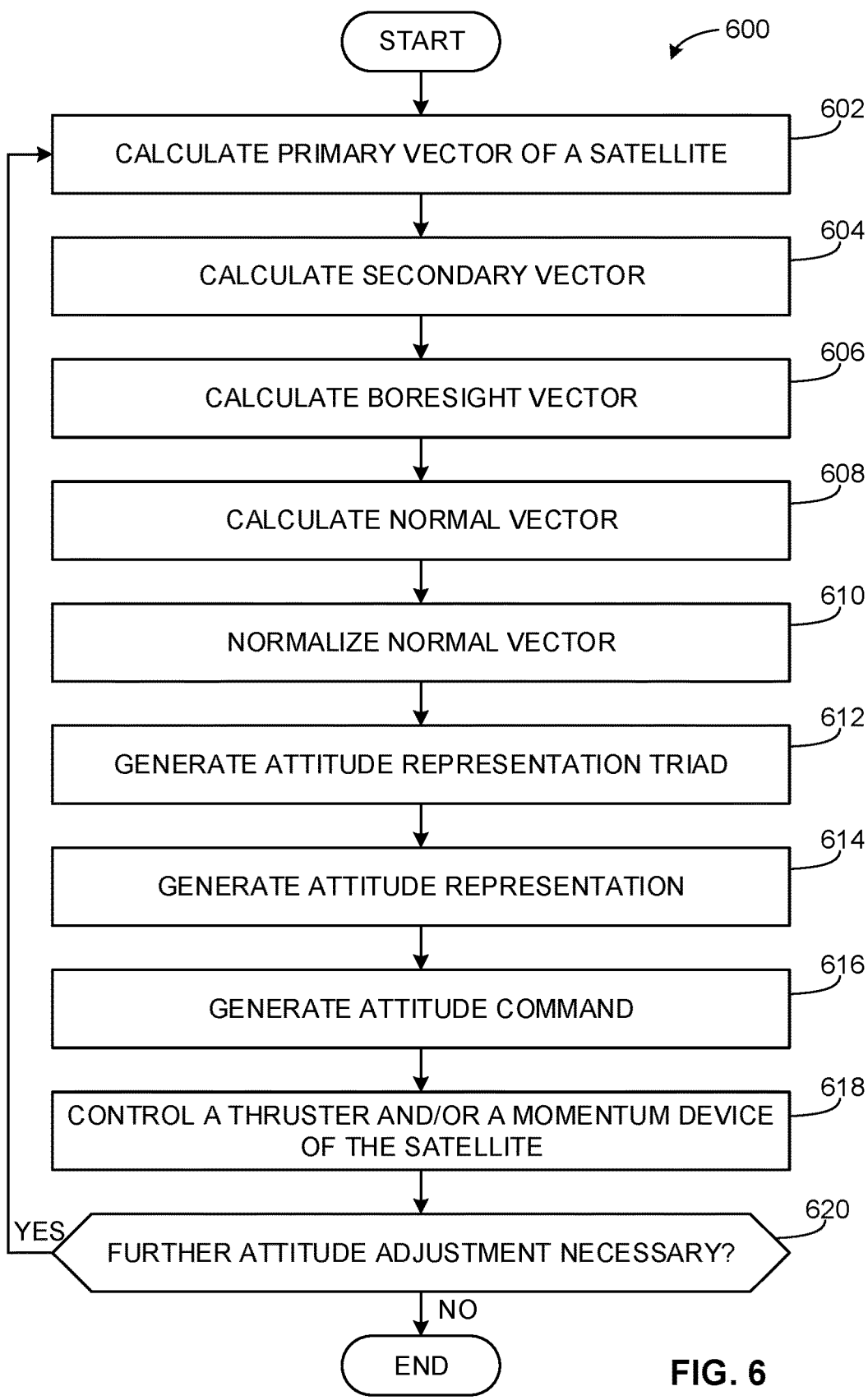
FIG. 6 is a flowchart representative of an example method that may be used to implement the example satellite guidance system of FIG. 2.
Figure 7:
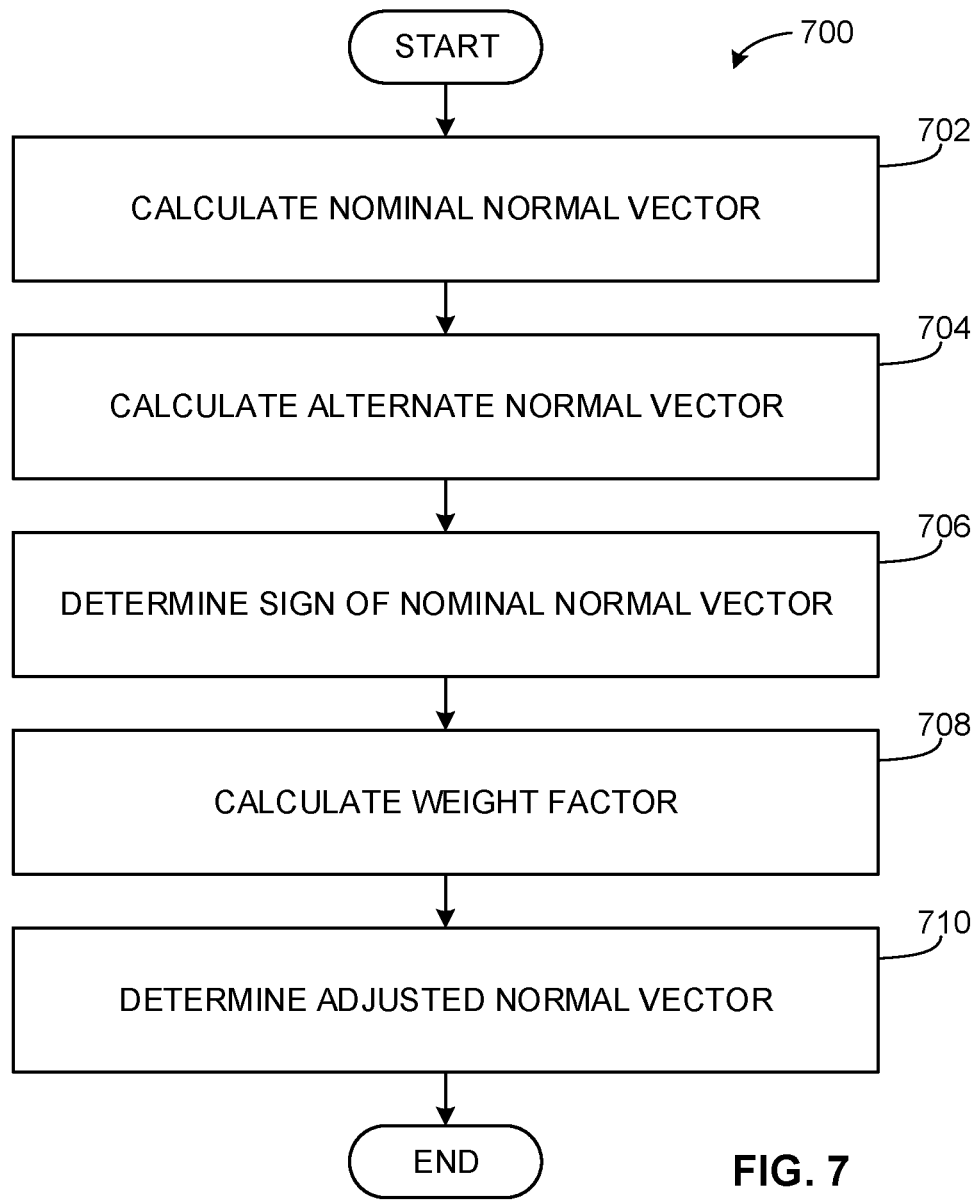
FIG. 7 is a flowchart representative of another example method that may be used to implement the example satellite guidance system of FIG. 2.

Flowcharts representative of example methods for implementing the example satellite controller 104 of FIGS. 1-2 are shown in FIGS. 6-7. In these examples, the methods may be implemented using machine-readable instructions that comprise a program for execution by a processor such as the processor 812 shown in the example processor platform 800 discussed below in connection with FIG. 8. The program may be embodied in software stored on a tangible computer-readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812, and/or embodied in firmware or dedicated hardware. Further, although the example program is described with reference to the flowcharts illustrated in FIGS. 6-7, many other methods of implementing the example satellite controller 104 may alternatively be used. For example, the order of execution of the blocks may be changed, and/or some of the blocks described may be changed, eliminated, or combined.

As mentioned above, the example methods of FIGS. 6-7 may be implemented using coded instructions (e.g., computer and/or machine-readable instructions) stored on a tangible computer-readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally or alternatively, the example methods of FIGS. 6-7 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 6 is a flowchart representative of an example method 600 that may be performed by the example satellite controller 104 of FIGS. 1-2 to maneuver a satellite based on an attitude command. The example method 600 begins at 602 when the example satellite controller 104 calculates a primary vector of a satellite. For example, the steering law module 206 may calculate a nominal primary vector of the satellite 100 of FIG. 1. The example steering law module 206 may determine that the nominal primary vector is a vector from a center of gravity of the satellite 100 pointing towards a target (e.g., a point on the Earth). At block 604, the example satellite controller 104 calculates a secondary vector. For example, the steering law module 206 may calculate a nominal secondary vector of the satellite 100. The example steering law module 206 may determine that the nominal secondary vector may be a vector from the center of gravity of the satellite 100 pointing towards a power source (e.g., a light source from a celestial body, the Sun, etc.).

At block 606, the example satellite controller 104 calculates a boresight vector. For example, the targeting module 202 may calculate a boresight vector of the satellite 100. At block 608, the example satellite controller 104 calculates a normal vector. For example, the steering law module 206 may calculate a normal vector (e.g., $\vec{n}_{adjusted}$) based on a set of nominal vectors, a set of alternate vectors, and/or a combination thereof. At block 610, the example satellite controller 104 normalizes the normal vector. For example, the steering law module 206 may normalize the adjusted normal vector $\vec{n}_{adjusted}$. At block 612, the example satellite controller 104 generates an attitude representation triad. For example, the steering law module 206 may generate the attitude representation triad (e.g., $\vec{v}_1$, $\vec{v}_2$, and $\vec{v}_3$). At block 614, the example satellite controller 104 generates an attitude representation. For example, the steering law module 206 may generate a transformation matrix (e.g., a direction cosine matrix), a quaternion, etc.

At block 616, the example satellite controller 104 generates an attitude command. For example, the attitude controller 208 may generate an attitude command based on the transformation matrix. At block 618, the example satellite controller 104 controls a thruster and/or a momentum device of the satellite. For example, the attitude controller 208 may transmit a command to the thrusters 112 to maneuver the satellite 100. At block 620, the example satellite controller 104 determines whether further attitude adjustment is necessary. For example, the attitude controller 208 may determine that an attitude zero is approximately zero. If, at block 620, the example satellite controller 104 determines that further attitude adjustment is necessary, control returns to block 602 to calculate another primary vector of the satellite, otherwise the example method 600 concludes.

FIG. 7 is a flowchart representative of an example method 700 that may be performed by the example satellite controller 104 of FIGS. 1-2 to calculate a normal vector based on a set of alternate vectors. The example method 700 begins at block 702 when the example satellite controller 104 calculates a nominal normal vector. For example, the steering law module 206 may generate a nominal normal vector based on a vector cross product between a nominal primary vector and a nominal secondary vector. At block 704, the example satellite controller 104 calculates an alternate normal vector. For example, the steering law module 206 may calculate an alternate normal vector that is normal to an orbital fixed frame plane.

At block 706, the example satellite controller 104 determines a sign of a nominal normal vector. For example, the steering law module 206 may determine to toggle a sign of the nominal normal vector based on projecting the nominal primary vector, the nominal secondary vector, etc. to an orbit fixed frame plane. At block 708, the example satellite controller 104 calculates a weight factor. For example, the steering law module 206 may calculate a weight factor α based on the linear method, the sinusoidal method, the exponential method, etc. as described above. At block 710, the satellite controller 104 determines an adjusted normal vector (e.g., $\vec{n}_{adjusted}$). For example, the steering law module 206 may calculate an adjusted normal vector based on the nominal normal vector (e.g., $\vec{n}_{nominal}$), the alternate normal vector (e.g., $\vec{n}_{alternate}$), the weight factor α, etc.

Figure 8:
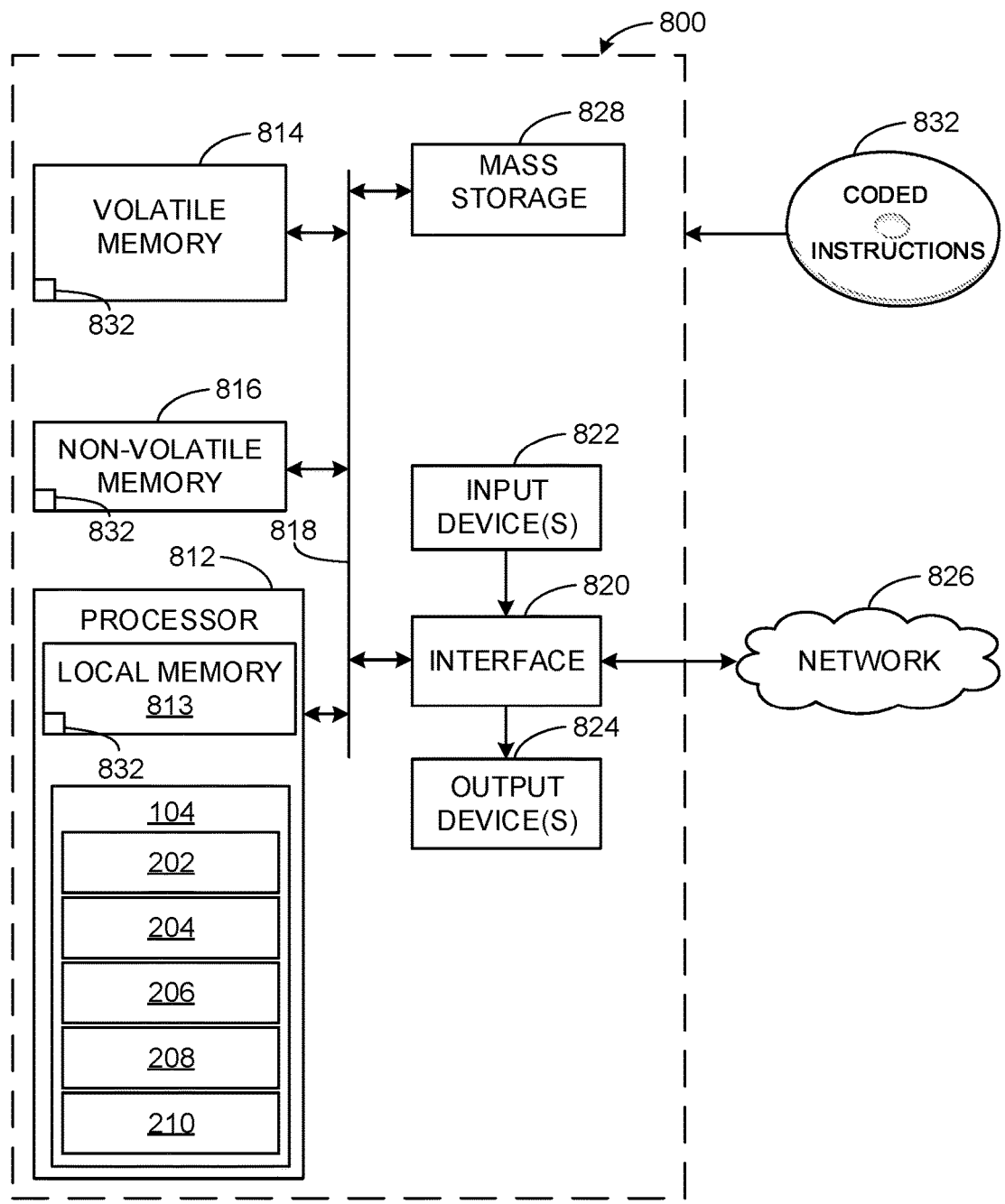
FIG. 8 is a block diagram of an example processing platform structured to execute machine-readable instructions to implement the methods of FIGS. 6-7 and/or the example satellite guidance system of FIG. 2.

FIG. 8 is a block diagram of an example processor platform 800 capable of executing instructions to implement the methods of FIGS. 6-7 and the example satellite controller 104 of FIGS. 1-2. The processor platform 800 can be, for example, a satellite control system, a satellite guidance system, a server, a personal computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example executes the instructions to implement the example targeting module 202, the example orientation module 204, the example steering law module 206, the example attitude controller 208, the example sensor interface 210 and/or, more generally, the example satellite controller 104. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 816 may be implemented by flash memory, and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system coupled to a ground communication system communicatively coupled to the processor platform 800.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers) coupled to a ground communication system communicatively coupled to the processing platform 800. The interface circuit 820 of the illustrated example, thus, typically includes a graphics driver card, a graphics driver chip, or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, a satellite communication system, etc.).

The processor platform 800 of the illustrated example also includes one or more mass storage devices 828 for storing software, and/or data. Examples of such mass storage devices 828 include floppy disk drives, hard drive disks, compact disk drives, Blu-ray disk drives, RAID systems, magnetic media, and digital versatile disk (DVD) drives. The example mass storage 828 implements the example database 214.

Coded instructions 832 to implement the methods represented by the flowcharts of FIGS. 6-7 may be stored in the mass storage device 828, in the volatile memory 814, in the non-volatile memory 816, and/or on a removable tangible computer-readable storage medium such as a CD or DVD.

From the foregoing, it will be appreciated that the above disclosed methods, apparatus, and articles of manufacture enable a space vehicle to maneuver in an orbit with minimized command dynamics. The example satellite controller apparatus disclosed herein prevent the space vehicle from generating a command resulting in a large slew angle, an unnecessary yaw flip, an unstable rotation, etc. based on the space vehicle approaching or experiencing a singularity condition. The example satellite controller apparatus disclosed herein enable singularity handling for a space vehicle orbiting a celestial body by calculating a set of alternate vectors during a transfer orbit, a final orbit, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a steering law module to:
      calculate a first set of vectors to maneuver a space vehicle; and
      calculate a second set of vectors based on projecting the first set of vectors onto a fixed plane; and
   an attitude controller to generate an attitude command based on the first and the second sets of vectors to control an actuator of the space vehicle to maneuver the space vehicle to affect at least one of an orbital path or an orbital height of the space vehicle.

2. The apparatus of claim 1, wherein the first set of vectors includes a first vector pointing from the space vehicle to a target in an inertial reference frame, and a second vector pointing from the space vehicle to a power source.

3. The apparatus of claim 2, wherein the inertial reference frame is an Earth-centered inertial coordinate frame and the power source is a light source from a celestial body.

4. The apparatus of claim 2, wherein the second set of vectors includes a third vector normal to the first and the second vectors, and a fourth vector normal to the first vector.

5. The apparatus of claim 4, wherein the steering law module is to calculate an angle between the third and the fourth vectors.

6. The apparatus of claim 5, wherein the attitude command is based on the steering law module calculating a weight factor to determine a contribution from each of the first and the second sets of vectors to the attitude command, the weight factor based on the angle.

7. The apparatus of claim 1, wherein the attitude controller is to generate the attitude command to prevent an unplanned rotation by the space vehicle.

8. A method comprising:
   calculating a first set of vectors to maneuver a space vehicle;
   calculating a second set of vectors based on projecting the first set of vectors onto a fixed plane; and
   generating an attitude command based on the first and the second sets of vectors to control an actuator of the space vehicle to maneuver the space vehicle to affect at least one of an orbital path or an orbital height of the space vehicle.

9. The method of claim 8, wherein the first set of vectors includes a first vector pointing from the space vehicle to a target in an inertial reference frame, and a second vector pointing from the space vehicle to a power source.

10. The method of claim 9, wherein the inertial reference frame is an Earth-centered inertial coordinate frame and the power source is a light source from a celestial body.

11. The method of claim 9, wherein the second set of vectors includes a third vector normal to the first and the second vectors, and a fourth vector normal to the first vector.

12. The method of claim 11, further including calculating an angle between the third and the fourth vectors.

13. The method of claim 12, wherein generating the attitude command includes calculating a weight factor to determine a contribution from each of the first and the second sets of vectors to the attitude command, the weight factor based on the angle.

14. The method of claim 13, wherein calculating of the weight factor includes using at least one of a linear method, a sinusoidal method, or an exponential method.

15. The method of claim 8, wherein the attitude command prevents an unplanned rotation by the space vehicle.

16. A tangible computer-readable storage medium comprising instructions that, when executed, cause a machine to at least:
   calculate a first set of vectors to maneuver a space vehicle;
   calculate a second set of vectors based on projecting the first set of vectors onto a fixed plane; and
   generate an attitude command based on the first and the second sets of vectors to control an actuator of the space vehicle to maneuver the space vehicle to affect at least one of an orbital path or an orbital height of the space vehicle.

17. The tangible computer-readable storage medium of claim 16, wherein the first set of vectors includes a first vector pointing from the space vehicle to a target in an inertial reference frame, and a second vector pointing from the space vehicle to a power source.

18. The tangible computer-readable storage medium of claim 17, wherein the inertial reference frame is an Earth-centered inertial coordinate frame and the power source is a light source from a celestial body.

19. The tangible computer-readable storage medium of claim 17, wherein the second set of vectors includes a third vector normal to the first and the second vectors, and a fourth vector normal to the first vector.

20. The tangible computer-readable storage medium of claim 19, further including instructions that when executed, cause the machine to calculate an angle between the third and the fourth vectors.

21. The tangible computer-readable storage medium of claim 20, wherein generating the attitude command includes calculating a weight factor to determine a contribution from each of the first and the second sets of vectors to the attitude command, the weight factor based on the angle.

22. The tangible computer-readable storage medium of claim 21, wherein calculating of the weight factor includes using at least one of a linear method, a sinusoidal method, or an exponential method.

23. The tangible computer-readable storage medium of claim 16, wherein the attitude command prevents an unplanned rotation by the space vehicle.

* * * * *